(12) United States Patent
Varga

(10) Patent No.: US 6,761,564 B2
(45) Date of Patent: Jul. 13, 2004

(54) INFANT/TODDLER PUPPET AND MEDICAL INSTRUMENT

(76) Inventor: Josephine Varga, 1746 Dakota St., Westfield, NJ (US) 07090

( * ) Notice: Subject to any disclaimer, the term of this patent is extended or adjusted under 35 U.S.C. 154(b) by 0 days.

(21) Appl. No.: 10/331,291

(22) Filed: Dec. 30, 2002

(65) Prior Publication Data

US 2004/0081943 A1 Apr. 29, 2004

Related U.S. Application Data

(60) Provisional application No. 60/420,303, filed on Oct. 23, 2002.

(51) Int. Cl.[7] ............................................. G09B 23/28
(52) U.S. Cl. ...................................................... 434/236
(58) Field of Search ................................ 446/327, 328, 446/329; 434/236, 262; 604/48, 77, 78

(56) References Cited

U.S. PATENT DOCUMENTS

| 3,299,891 | A | * | 1/1967 | Smeton | 604/232 |
| D274,971 | S | * | 8/1984 | Kelley et al. | D7/656 |
| 4,779,344 | A | * | 10/1988 | Panisch | 30/326 |
| 4,976,646 | A | * | 12/1990 | Hull | 446/74 |
| 5,022,093 | A | * | 6/1991 | Hall | 2/158 |
| 5,580,292 | A | * | 12/1996 | Gaportsin | 446/8 |
| 5,609,507 | A | * | 3/1997 | Spector | 446/72 |
| 5,975,980 | A | * | 11/1999 | Whiteneck | 446/327 |
| 5,993,285 | A | * | 11/1999 | Sofia et al. | 446/327 |

* cited by examiner

Primary Examiner—Kurt Fernstrom
(74) Attorney, Agent, or Firm—Walter J. Tencza, Jr.

(57) ABSTRACT

An apparatus comprising a puppet and a medical instrument is disclosed. The medical instrument may be a medicine dispenser and may be comprised of a tube portion and a handle portion. The puppet may have an opening such as a mouth portion, from which the tube portion of the medicine dispenser can protrude. The puppet may have a chamber into which a hand can be inserted.

26 Claims, 3 Drawing Sheets

INFANT/TODDLER PUPPET AND MEDICAL INSTRUMENT

CROSS REFERENCE TO RELATED APPLICATIONS

The present application claims the priority of U.S. provisional application serial No. 60/420,303, inventor and applicant, Josephine Varga, filed on Oct. 23, 2002.

Field of the Invention

This invention relates to methods and apparatus for dispensing medicine to young children.

Background of the Invention

Many parents have faced the difficult task of trying to use medical instruments such as medicine dispensers, tongue depressors, or thermometers with young children. In particular many parents find it difficult to give medicine to very uncooperative infants, toddlers, and/or small children. These young patients, tend to either knock the medicine dispenser out of their parent's hand or, more often, spit the medicine out of their mouth. This leaves parents very frustrated. There is a need for better methods and apparatus for using medical instruments with young children.

SUMMARY OF THE INVENTION

The present invention provides an effective way to use medical instruments, such as medicine dispensers, tongue depressors, and thermometers with young children. In particular one or more embodiments of the present invention provide a method and apparatus for dispensing medicine to young children. One or more embodiments include an apparatus comprising a puppet and a medical instrument, such as a medicine dispenser. The medicine dispenser may be comprised of a tube portion and a handle. The puppet may have an opening from which the tube portion of the medicine dispenser may protrude. The puppet may have a chamber into which a hand can be inserted. In at least one embodiment, a hand can be inserted into the chamber of the puppet and the hand can squeeze the handle of the medicine dispenser to dispense medicine from the tube portion of the medicine dispenser while the hand and the handle are in the chamber of the puppet. A grommet may be attached to the puppet. The grommet may have an opening through which the tube portion of the medicine dispenser may protrude.

The present invention in one or more embodiments includes a method of using a medical instrument from a puppet. The method may further include inserting a medicine dispenser into the puppet so that at least part of a tube portion of the medicine dispenser protrudes outward from a mouth of the puppet. The medicine dispenser, effectively, may serve as the puppet's tongue.

DETAILED DESCRIPTION OF THE DRAWINGS

Figure 1:
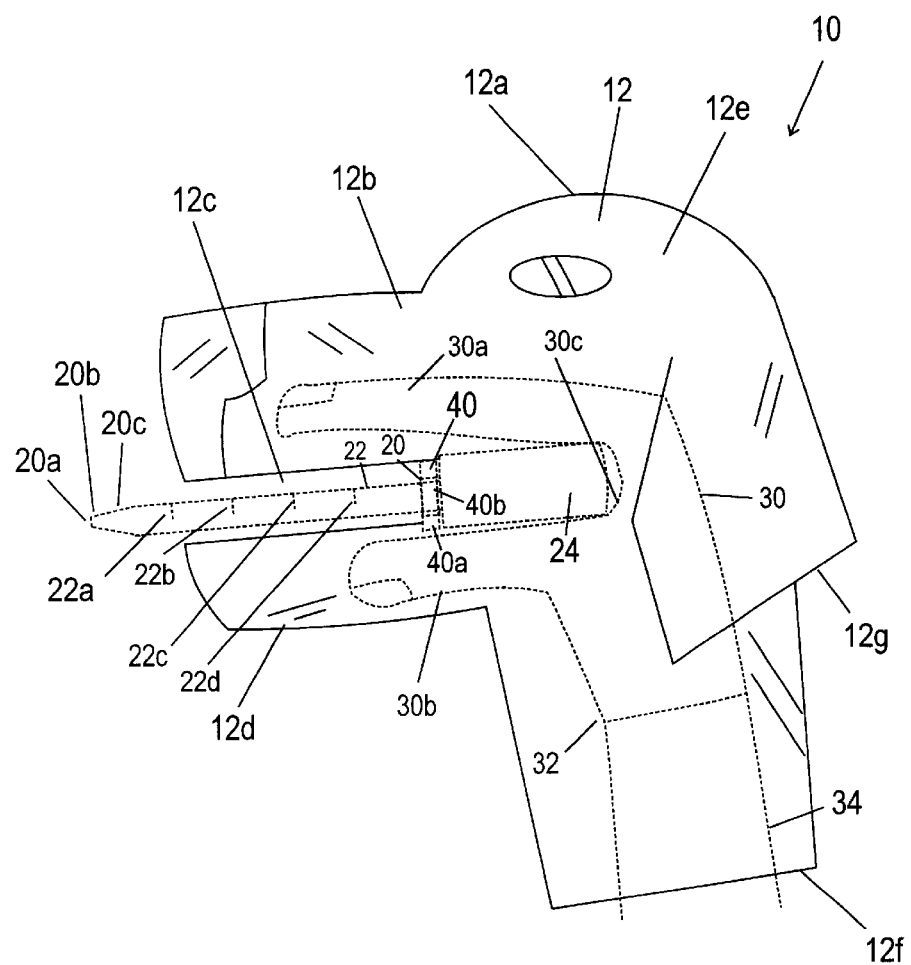
FIG. 1 shows a side view of a puppet along with a side view of an inserted hand and a dispenser shown in dashed lines.
Figure 2:
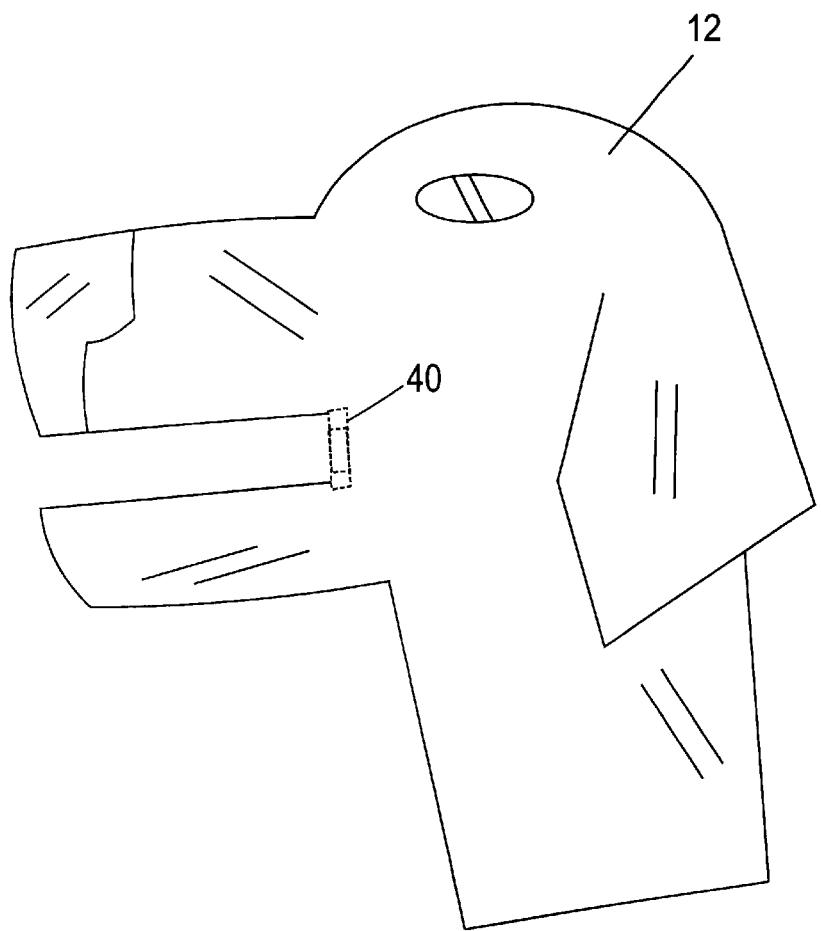
FIG. 2 shows a side view of the puppet of FIG. 1.
Figure 3:
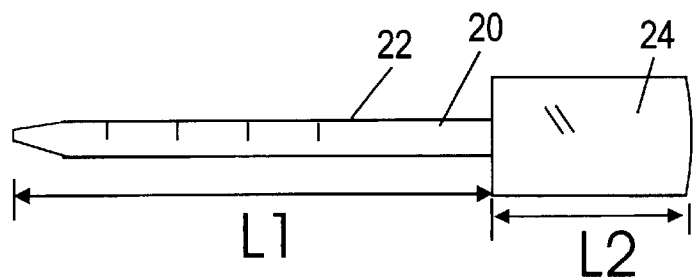
FIG. 3 shows a side view of the dispenser of FIG. 1.
Figure 4:
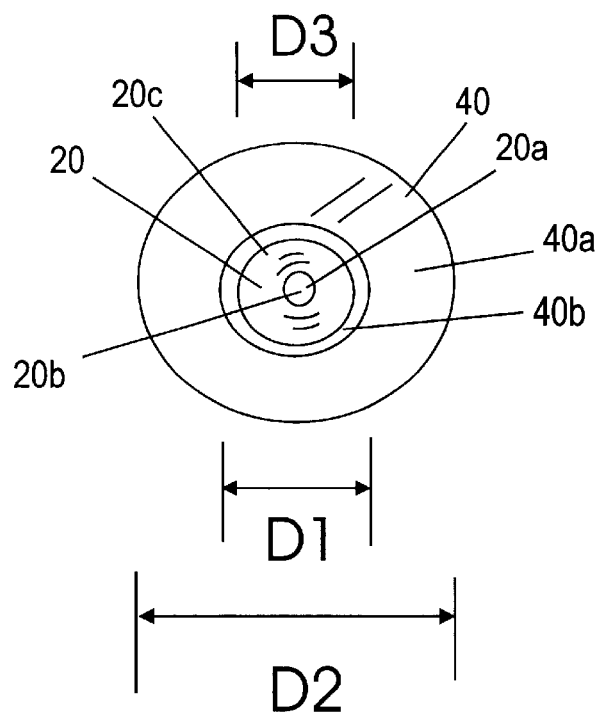
FIG. 4 shows a grommet or washer which can be used in the puppet of FIG. 1 and the tip of the dispenser of FIG. 1 inserted through the grommet.
Figure 5:
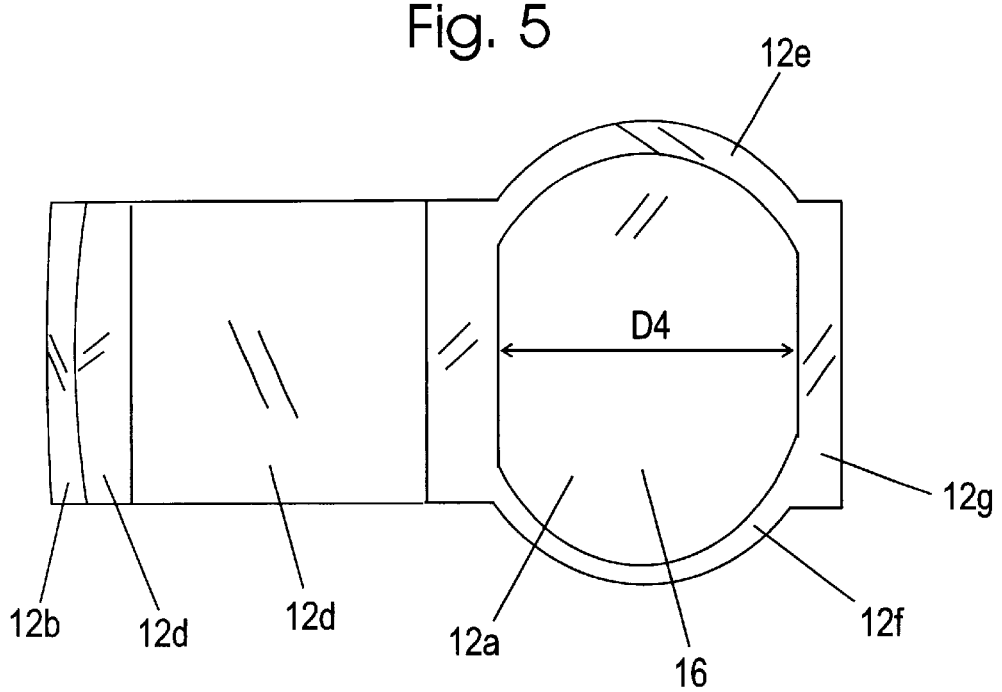
FIG. 5 shows a bottom view of the puppet of FIG. 1.

FIG. 1 shows a side view of an apparatus 10 including a puppet 12 and a medical instrument 20 which in this case may be a medicine dispenser, with the medical instrument 20 shown in dashed lines. FIG. 2 shows a side view of the puppet 12 by itself along with a grommet 40 within the puppet 12 shown in dashed lines. FIG. 3 shows a side view of the dispenser 20 of FIG. 1. FIG. 4 shows the grommet 40 or washer which can be used in the puppet 12 of FIG. 1 and the tip 20a of the medical instrument 20 FIG. 1 inserted through the grommet 40. FIG. 5 shows a bottom view of the puppet 12.

The puppet 12 may be a typical hand puppet with the exception of the grommet or washer 40. The washer 40 is connected on the inside of the puppet 12, by for example, sewing. In the example of FIGS. 1–5, the puppet 12 is a head and neck of a puppet dog. The puppet 12 includes nose portion 12b, mouth portion or gap 12c, jaw portion 12d, main portion 12e, and ear portion 12g. As shown by FIG. 5, the puppet 12 may be hollow and may have a chamber 16 which may run from a bottom end 12f to a top end 12a. The chamber 16 may have a diameter or width of D4 which may be six inches. The width or diameter of the chamber 16 should be large enough for an average adult human hand, such as hand 30, to be inserted into the chamber 16 and into main the portion 12e. The hand 30 when inserted into the chamber 16 typically is covered by the material of main portion 12e, so that the hand 30 can not be seen from outside the puppet 12, other than looking up through the bottom end 12f.

The dispenser 20 may be comprised of a tube portion 22 and a handle, compressor or dispensing portion 24. The tube portion 22 and the handle portion 24 may each be substantially cylindrical and hollow. The tube portion 22 may typically, not be flexible. A medicine, such as a liquid medicine may be placed in the tube portion 22. The liquid medicine can be dispensed through a nozzle or narrowed portion 20c, and then a hole 20b at an end 20a of the dispenser 20 by squeezing the handle portion 24 with a person's fingers. The tube portion 22 may include tick marks 22a, 22b, 22c, and 22d for marking the location and amount of medicine.

In operation, an individual can insert the end 20a of the tube portion 22 first through an opening at end 12f and into the chamber 16. The end 20a can then be inserted through an opening 40b in the grommet or washer 40 until the end 20a is in the position shown in FIG. 1. In the position of FIG. 1, the majority of the tube portion 22 protrudes outward from the mouth or gap portion 12c of the puppet 12. As shown by FIG. 4, the grommet 40 has an interior diameter of D1 which approximately ½ of an inch and which is typically greater than the diameter D3 of the tube portion 22 but which is less than the diameter D5 of the handle portion 24. The interior diameter D1 of the grommet 40 should be slightly larger than the diameter D3 of the tube portion 22 so that the tube portion 22 is held securely in place. This configuration allows the tube portion 22 to be inserted into the hole 40b of the grommet 40 but prevents the handle 24 from being inserted through the hole 40b. After the tube portion 22 has been inserted and placed into the position of FIG. 1, an adult can place the tip 20a of the dispenser 20 into a child's mouth. The child will open its mouth and the adult can then squeeze or compress the handle 24 to dispense the liquid medicine in the tube portion 22 into the child's mouth. The holding of the handle 24 also serves to hold the puppet 12 in place and controls the flow of medicine to the infant or toddler. As the handle 24 is compressed the medicine flows through the nozzle or narrowed portion 20c and through opening 20b at end 20a and into a child's mouth. The hand 30 may be comprised of four fingers, such as finger 30*a* and thumb 30*b* and three other fingers not shown. The hand 30 may be comprised of a palm 30*c*. The handle 24 can be compressed by one or more fingers and/or the palm 30*c*. For example the handle 24 can be compressed by the combination of the finger 30*a*, thumb 30*b*, and the palm 30*c*. At the same time the fingers can control the movement of the puppet 12. For example, the finger 30*a* and three other fingers, not shown may control the movement of portion 12*b*, while the thumb 30*b* may control the movement of the portion 12*d*, so that the adult's fingers can make the puppet 12 move as if it is talking, i.e. open and close the mouth or gap portion 12*c*. The finger 30*a* (and three further fingers not shown) may be inserted into the nose portion 12*b* for the purpose of controlling movement of portion 12*b* and the thumb 30*b* may be inserted into the portion 12*d* for the purpose of controlling movement of the portion 12*d*. The puppet 12 may be hollow and compeletely or substantially closed, so that a child cannot see the hand 30 after insertion into the puppet 12, except for the opening 12*e* where the hand 30 and the dispenser 20 can be inserted, and the opening 40*b* of the grommet 40.

The entire tube portion 22 may be called a nozzle or the narrowed portion 20*c* may be called a nozzle. The tube portion 22 may be of varying lengths but typically will have a length of L1, shown in FIG. 3, which may be about four inches. The handle 24 may be a compressible rubber bulb, which may have a length of L2, which may be about one and one half inches. The grommet 40 may be replaced by or may be any type of insert. The grommet 40 can be flexible to allow for easy movement of the medicine dispenser 20 by the user.

An adult dispensing medicine to a child by use of apparatus 10 can use the puppet 12 to hold the child's attention and keep him or her calm whole dispensing the medicine into his or her mouth. The puppet 12 can be created to look like various characters. For example, in FIG. 1 and FIG. 2, the puppet is made to look like a dog.

The present invention in one or more embodiments provides an improved method of dispensing medicine to infants and toddlers. The puppet 12 may be lightweight and flexible to allow for easy operation. The puppet 12 may be made of any suitable material such as for example any lightweight fabric, such as cloth or nylon. The dispenser 20 is typically rigid.

The present invention in one or more embodiments will help to hold a child's attention and keep them calm long enough to dispense medicine. The child may no longer resist taking the medicine and may actually look forward to the experience.

Other objects, such as other medical instruments, other than the dispenser 20 can be inserted through the opening 40*b* in the grommet 40. For example, a tongue depressor or a thermometer may be inserted through the opening 40*b* and take the place of the dispenser 20. Also the grommet 40 may be replaced by a grommet having a different inner diameter D3, depending on the type of object or medical instrument which may be used and/or inserted.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:

a puppet; and and a medical instrument; and wherein the puppet has a nose portion and a jaw portion which are separate and distinct from the medical instrument, so that the nose portion and the jaw portion can move independent of the medical instrument;

and wherein the medical instrument protrudes outward from the puppet through an opening in the puppet which is located between the nose portion and the jaw portion.

2. The apparatus of claim 1 wherein the medical instrument is a medicine dispenser.

3. The apparatus of claim 2 wherein the medicine dispenser is comprised of a tube portion.

4. The apparatus of claim 3 wherein the tube portion of the medicine dispenser can be inserted through the opening of the puppet.

5. The apparatus of claim 2 wherein the medicine dispenser is comprised of a tube portion and a handle.

6. The apparatus of claim 5 wherein the puppet has an opening through which the tube portion of the medicine dispenser can be inserted;

and the puppet is hollow and has a chamber in which the handle of the medicine dispenser can be inserted.

7. An apparatus comprising:

a puppet; and a medical instrument;

wherein the medical instrument is a medicine dispenser; and wherein the puppet has a chamber into which an entire average adult human hand can be inserted, while at least a portion of the medical instrument is also in the chamber.

8. The apparatus of claim 6 wherein the puppet has a nose portion and a jaw portion which are separate and distinct from the medical instrument, so that the nose portion and the jaw portion can move independent of the medical instrument;

and wherein the medical instrument protrudes outward from the puppet through an opening in the puppet which is located between the nose portion and the jaw portion; and wherein at least one finger of the hand can be inserted into the nose portion to control movement of the nose portion and simultaneously at least one finger of the hand can be inserted into the jaw portion to control movement of the jaw portion.

9. An apparatus comprising:

a puppet; and a medical instrument;

wherein the medical instrument is a medicine dispenser; and the medicine dispenser is comprised of a tube portion and a handle; and wherein the puppet has an opening through which the tube portion of the medicine dispenser can be inserted, and the puppet is hollow and has a chamber in which the handle of the medicine dispenser can he inserted; and wherein a hand can be inserted into the chamber of the puppet and the hand can squeeze the handle of the medicine dispenser to dispense medicine from the tube portion of the medicine dispenser while the hand and the handle are in the chamber of the puppet.

10. The apparatus of claim 3 further comprising a grommet attached to the puppet; and wherein the grommet has an opening and the opening of the puppet is the opening of the grommet.

11. The apparatus of claim 3 wherein the puppet has a mouth; and wherein the tube portion of the medicine dispenser can be inserted into the puppet so that the tube portion protrudes outward from the mouth of the puppet.

12. The apparatus of claim 1 wherein the medical instrument is a tongue depressor.

13. The apparatus of claim 1 wherein the medical instrument is a thermometer.

14. The apparatus of claim 9 wherein the hand is an average human adult hand which is comprised of five fingers, and the entire hand can be inserted into the chamber together with the handle of the medicine dispenser.

15. The apparatus of claim 9 wherein the medicine dispenser is further comprised of a handle;

wherein the handle of the medicine dispenser has a dimension, and the tube portion of the medicine dispenser has a dimension which is smaller than the dimension of the handle;

wherein the dimension of the tube portion allows the tube portion to fit through the grommet, and wherein the dimension of the handle does not allow the handle to fit through the grommet.

16. A method comprising dispensing medicine from a medical instrument which is at least partially located in a puppet;

wherein the puppet has a none portion and a jaw portion which are separate and distinct from the medical instrument, so that the nose portion and the jaw portion can move independent of the medical instrument;

and wherein the medical instrument protrudes outward from the puppet through an opening in the puppet which is located between the nose portion and the jaw portion.

17. The method of claim 16 wherein the medical instrument is a medicine dispenser.

18. The method of claim 17 further comprising inserting the medicine dispenser into the puppet so that at least part of a tube portion of the medicine dispenser protrudes outward from a mouth of the puppet.

19. The method of claim 17 wherein at least part of a tube portion of the medicine dispenser can protrude outwards from the puppet.

20. A method comprising dispensing medicine from a medical instrument which is at least partially located in a puppet; wherein the puppet has a chamber into which an entire average human adult hand can be inserted while the medical instrument is at least partially located in the puppet.

21. The method of claim 17 wherein the medicine dispenser is comprised of a tube portion and a handle.

22. The method of claim 21 wherein the tube portion of the medicine dispenser can be inserted through the opening of the puppet;

and the puppet is hollow and has a chamber into which the handle of the medicine dispenser can be inserted.

23. A method comprising dispensing medicine from a medical instrument which is at least partially located in a puppet;

wherein the medical instrument is a medicine dispenser;

the medicine dispenser is comprised of a tube portion and a handle the puppet has an opening through which the tube portion of the medicine dispenser can be inserted;

and the puppet is hollow and has a chamber into which the handle of the medicine dispenser can be inserted; and wherein a hand can be inserted into the chamber of the puppet and the hand can squeeze the handle of the medicine dispenser to dispense medicine from the tube portion of the medicine dispenser while the hand and the handle are in the chamber of the puppet.

24. The method of claim 23 wherein the hand is an average human adult hand which is comprised of five fingers, and the entire hand can be inserted into the chamber together with the handle of the medicine dispenser.

25. The method of claim 17 further comprising attaching a grommet to the puppet; and wherein medicine is dispensed from the puppet through the grommet.

26. The method of claim 25 wherein the medicine dispenser is comprised of a tube portion and a handle;

wherein the handle of the medicine dispenser has a dimension, and the tube portion of the medicine dispenser has a dimension which is smaller than the dimension of the handle;

wherein the dimension of the tube portion allows the tube portion to fit through the grommet, and wherein the dimension of the handle does not allow the handle to fit through the grommet.

* * * * *